US008806745B2

(12) United States Patent
Tsukimoto et al.

(10) Patent No.: US 8,806,745 B2
(45) Date of Patent: Aug. 19, 2014

(54) GAS-TURBINE-STATOR-VANE INSERT REMOVING DEVICE AND METHOD OF REMOVING GAS-TURBINE-STATOR-VANE INSERT

(75) Inventors: Koji Tsukimoto, Tokyo (JP); Yuki Osame, Tokyo (JP); Yasushi Takeuchi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 332 days.

(21) Appl. No.: 13/390,205

(22) PCT Filed: Jan. 6, 2011

(86) PCT No.: PCT/JP2011/050092
§ 371 (c)(1),
(2), (4) Date: Feb. 13, 2012

(87) PCT Pub. No.: WO2011/086962
PCT Pub. Date: Jul. 21, 2011

(65) Prior Publication Data

US 2012/0138581 A1 Jun. 7, 2012

(30) Foreign Application Priority Data

Jan. 18, 2010 (JP) ................................. 2010-008175

(51) Int. Cl.

| | |
|---|---|
| ***B23H 1/04*** | (2006.01) |
| ***B23H 9/10*** | (2006.01) |
| ***B23P 6/00*** | (2006.01) |
| ***B23K 35/02*** | (2006.01) |

(52) U.S. Cl.
USPC ........ 29/889.1; 228/119; 228/264; 219/69.15

(58) Field of Classification Search
USPC ............... 29/889.1, 402.01–402.21; 228/119, 228/125, 191, 264; 219/69.15, 69.17, 69.2
See application file for complete search history.

(56) References Cited

U.S. PATENT DOCUMENTS 4,141,124 A * 2/1979 Ryan ............................ 29/889.1
5,560,841 A * 10/1996 DeMichael et al. ......... 219/85.1

(Continued)

FOREIGN PATENT DOCUMENTS

CN 1038495 A 1/1990
CN 1646791 A 7/2005

(Continued)

OTHER PUBLICATIONS

International Search Report of PCT/JP2011/050092, mailing date of Mar. 29, 2011.

(Continued)

*Primary Examiner* — Samuel M Heinrich
(74) *Attorney, Agent, or Firm* — Westerman, Hattori, Daniels & Adrian, LLP

(57) ABSTRACT

In a gas-turbine-stator-vane insert removing device with which welding metal that connects an insert collar, which protrudes outward from an outer circumferential surface of an insert, and a stator-vane-outer-shroud non-gas path surface, which surrounds the periphery of the insert collar, is removed by means of an arc discharge repeated at a short cycle between an electrode and a gas-turbine stator vane, a bottom surface of the electrode has the same plan-view shape as a plan-view shape of the welding metal.

4 Claims, 5 Drawing Sheets

(56) References Cited

U.S. PATENT DOCUMENTS

| | | | | |
|---|---|---|---|---|
| 5,985,127 | A | 11/1999 | Greenslade | |
| 6,120,244 | A | 9/2000 | Fukura | |
| 7,723,636 | B2 * | 5/2010 | Ochiai et al. | 219/69.17 |
| 2009/0067987 | A1 | 3/2009 | Pellet et al. | |
| 2013/0206737 | A1 * | 8/2013 | Holmes et al. | 219/121.67 |

FOREIGN PATENT DOCUMENTS

| | | | |
|---|---|---|---|
| EP | 1057565 | A2 | 12/2000 |
| EP | 2025864 | A2 | 2/2009 |
| JP | 59-76671 | A | 5/1984 |
| JP | 62-246424 | A | 10/1987 |
| JP | 10-203493 | A | 8/1998 |
| JP | 11-2103 | A | 1/1999 |

OTHER PUBLICATIONS

Office Action dated Oct. 10, 2013, issued in Chinese application No. 201180003511.3, with English translation.

Decision to Grant a Patent issued on Oct. 29, 2013 in Japan application No. 2010-008175.

Decision to Grant a Patent dated Apr. 2, 2013, issued in corresponding Korean Patent Application No. 10-2012-7004343 (2 pages).

Chinese Decision to Grant a Patent dated Feb. 26, 2014, issued in corresponding Chinese Patent Application No. 201180003511.3, w/concise statement of relevance (3 pages).

* cited by examiner

GAS-TURBINE-STATOR-VANE INSERT REMOVING DEVICE AND METHOD OF REMOVING GAS-TURBINE-STATOR-VANE INSERT

TECHNICAL FIELD

The present invention relates to a gas-turbine-stator-vane insert removing device employed when detaching an insert from a gas-turbine stator vane and a method of removing a gas-turbine-stator-vane insert.

BACKGROUND ART

In the related art, for example, when detaching an insert from a blade surface (blade main unit) of a gas-turbine stator vane disclosed in Patent Literature 1, welding metal that connects an insert collar that protrudes outward from an outer circumferential surface of the insert and a stator-vane-outer-shroud non-gas path surface that surrounds the periphery of the insert collar is worn off with a grinding machine, such as a grinder, etc., and the insert is taken out from a corresponding hollow hole, thus separating the insert from the blade surface.

Note that, from the view points of environment and cost, the blade surface from which the insert is detached and the insert detached from the blade surface are subjected to appropriate refurbishing, etc., as needed, and reassembled to be subsequently reused as a gas-turbine stator vane.

CITATION LIST

Patent Literature

{PTL 1} Japanese Unexamined Patent Application, Publication No. Hei 11-2103.

SUMMARY OF INVENTION

Technical Problem

However, with the method in the related art, in which the welding metal is worn off by using a grinding machine, such as a grinder, etc., the welding metal must be carefully worn off so as not to damage the outer circumferential surfaces of inserts; in addition, even for a person with well-developed skill, it is extremely difficult to wear off welding metal at narrow portions between adjacent inserts; and thus, there is a problem in that the work of detaching (removing) the inserts requires a large amount of time and effort, thus resulting in poor work efficiency.

The present invention has been conceived in light of the above-described circumstances, and an object thereof is to provide a gas-turbine-stator-vane insert removing device and a method of removing a gas-turbine-stator-vane insert with which it is possible even for a person without well-developed skill to easily and quickly detach an insert from a blade surface of a gas-turbine stator vane.

Solution to Problem

In order to solve the above-described problems, the present invention employs the following solutions.

A gas-turbine-stator-vane insert removing device according to a first aspect of the present invention is a gas-turbine-stator-vane insert removing device with which welding metal that connects an insert collar, which protrudes outward from an outer circumferential surface of an insert, and a stator-vane-outer-shroud non-gas path surface, which surrounds the periphery of the insert collar, is removed by means of an arc discharge repeated at a short cycle between an electrode and a blade surface of a gas-turbine stator vane, wherein a bottom surface of the electrode has the same plan-view shape as a plan-view shape of the welding metal.

With the gas-turbine-stator-vane insert removing device according to the first aspect of the present invention, the gas-turbine stator vane, from which the insert is to be detached, is set at the predetermined position in the gas-turbine-stator-vane insert removing device; the electrode and the welding metal are aligned so that the bottom surface of the electrode faces the welding metal, and, in addition, so that a predetermined gap is formed between the bottom surface of the electrode and the welding metal; and the welding metal is removed by means of an electrical discharge by activating the gas-turbine-stator-vane insert removing device and by generating an arc discharge between the bottom surface of the electrode and the stator-vane-outer-shroud non-gas path surface.

Accordingly, it is possible even for a person without well-developed skill to easily and quickly detach the insert from the gas-turbine stator vane.

In the above-described gas-turbine-stator-vane insert removing device, it is more preferable that the bottom surface be shaped so as to match a curved-shape surface of the stator-vane-outer-shroud non-gas path surface of the blade surface which faces the bottom surface during electrical discharging.

With such a gas-turbine-stator-vane insert removing device, because the gap between the bottom surface of the electrode and the welding metal is kept (substantially) constant in the circumferential direction, the intensity of the arc discharge generated between the bottom surface of the electrode and the stator-vane-outer-shroud non-gas path surface can be kept (substantially) constant in the circumferential direction, and the welding metal can be (substantially) evenly removed in the circumferential direction.

In the above-described gas-turbine-stator-vane insert removing device, it is more preferable that an inner circumferential edge of the bottom surface be formed so as to be positioned 1 mm to 2 mm inside an inner circumferential edge of the welding metal.

With such a gas-turbine-stator-vane insert removing device, because a circumferential edge of the insert collar melted into the welding metal is exposed, thus disengaging the connection between the insert collar and the stator-vane-outer-shroud non-gas path surface, it is possible to eliminate work such as eliminating (removing) the connecting portion between the insert collar and the stator-vane-outer-shroud non-gas path surface by using a grinding machine, such as a grinder, etc.; the work time can be shortened; and the work efficiency can be further improved.

A method of removing a gas-turbine-stator-vane insert according a second aspect of the present invention is a method of removing a gas-turbine-stator-vane insert performed by employing the gas-turbine-stator-vane insert removing device according to any one of claims 1 to 3, including a step of setting a gas-turbine stator vane, from which an insert is to be detached, at a predetermined position in the gas-turbine-stator-vane insert removing device; a step of aligning the electrode and the welding metal so that the bottom surface of the electrode faces the welding metal, and, in addition, so that a predetermined gap is formed between the bottom surface of the electrode and the welding metal; a step of removing the welding metal by means of electrical discharge by activating the gas-turbine-stator-vane insert removing device and by generating an arc discharge between the bottom surface of the electrode and the stator-vane-outer-shroud non-gas path surface; and a step of separating the insert from the blade surface.

With the method of removing a gas-turbine-stator-vane insert according to the second aspect of the present invention, the gas-turbine stator vane, from which the insert is to be detached, is set at the predetermined position in the gas-turbine-stator-vane insert removing device; the electrode and the welding metal are aligned so that the bottom surface of the electrode faces the welding metal, and, in addition, so that a predetermined gap is formed between the bottom surface of the electrode and the welding metal; and the welding metal is removed by means of electrical discharge by activating the gas-turbine-stator-vane insert removing device and by generating the arc discharge between the bottom surface of the electrode and the stator-vane-outer-shroud non-gas path surface.

Accordingly, it is possible even for a person without well-developed skill to easily and quickly detach the insert from the gas-turbine stator vane.

Advantageous Effects of Invention

The gas-turbine-stator-vane insert removing device and the method of removing a gas-turbine-stator-vane insert according to the present invention afford an advantage in that it is possible even for a person without well-developed skill to easily and quickly detach an insert from a blade surface of a gas-turbine stator vane.

DESCRIPTION OF EMBODIMENT

A gas-turbine-stator-vane insert removing device and a method of removing a gas-turbine-stator-vane insert according to an embodiment of the present invention will be described below with reference to FIGS. 1 to 6.

Figure 1:
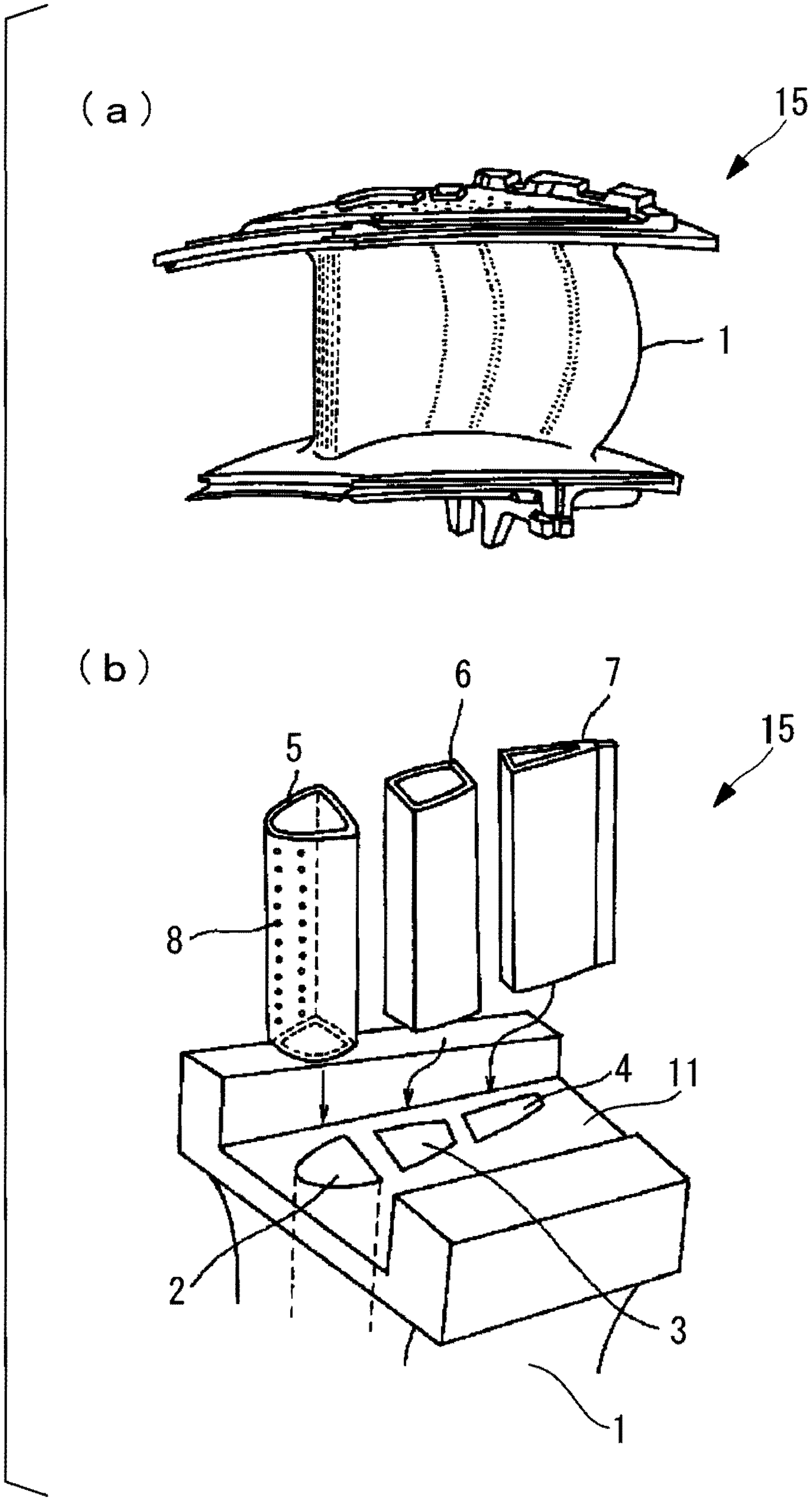
FIG. 1 is an external view of a gas-turbine stator vane according to the present invention, where (a) is an overall view and (b) is a perspective view showing a state in which an insert is taken out from a hollow hole.
Figure 2:
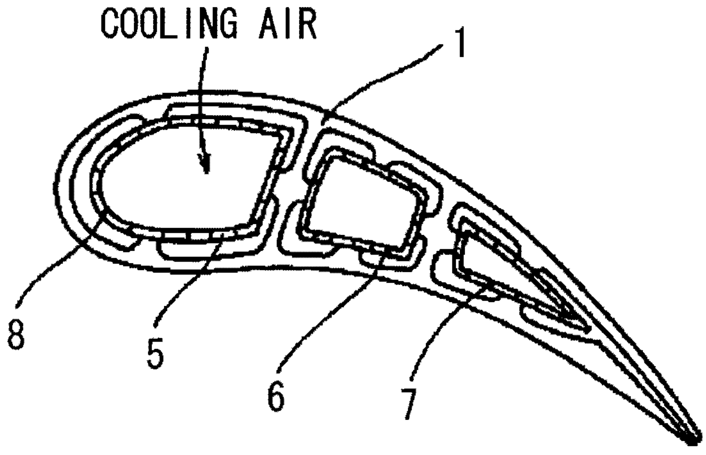
FIG. 2 is a plan view showing relevant portions in FIG. 1.
Figure 3:
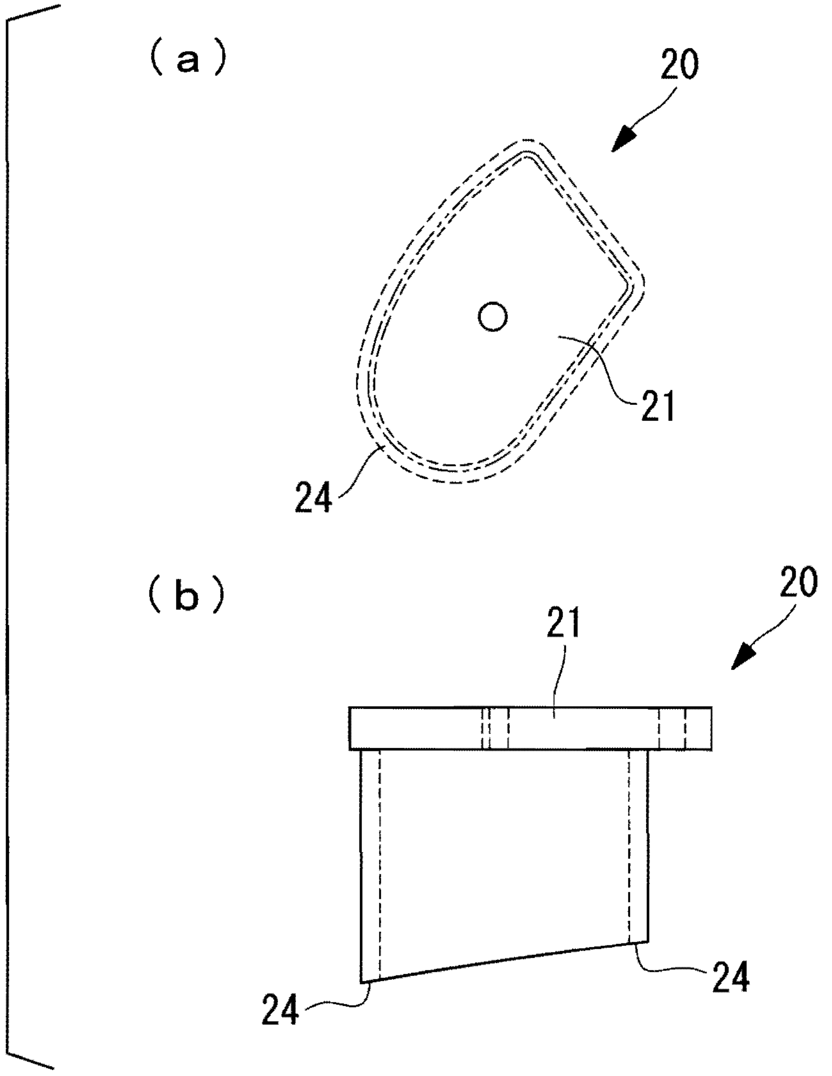
FIG. 3 is a diagram showing a front-insert electrode that forms a gas-turbine-stator-vane insert removing device according to an embodiment of the present invention, where (a) is a plan view thereof and (b) is a side view thereof.
Figure 4:
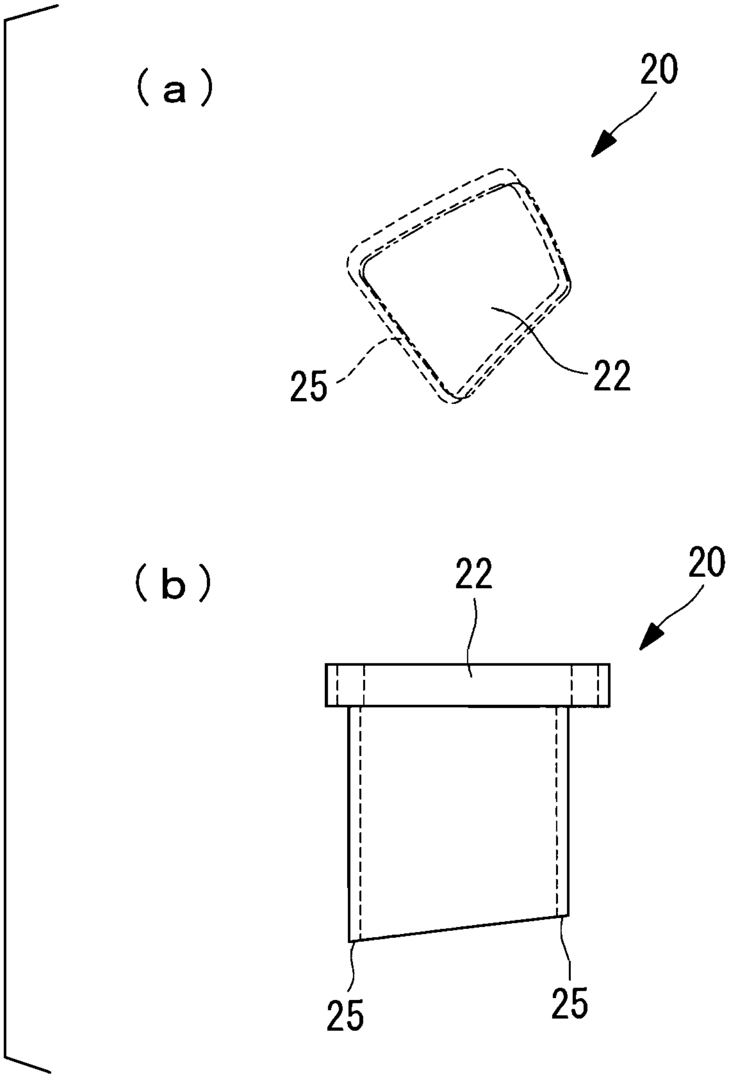
FIG. 4 is a diagram showing a middle-insert electrode that forms the gas-turbine-stator-vane insert removing device according to the embodiment of the present invention, where (a) is a plan view thereof and (b) is a side view thereof.
Figure 5:
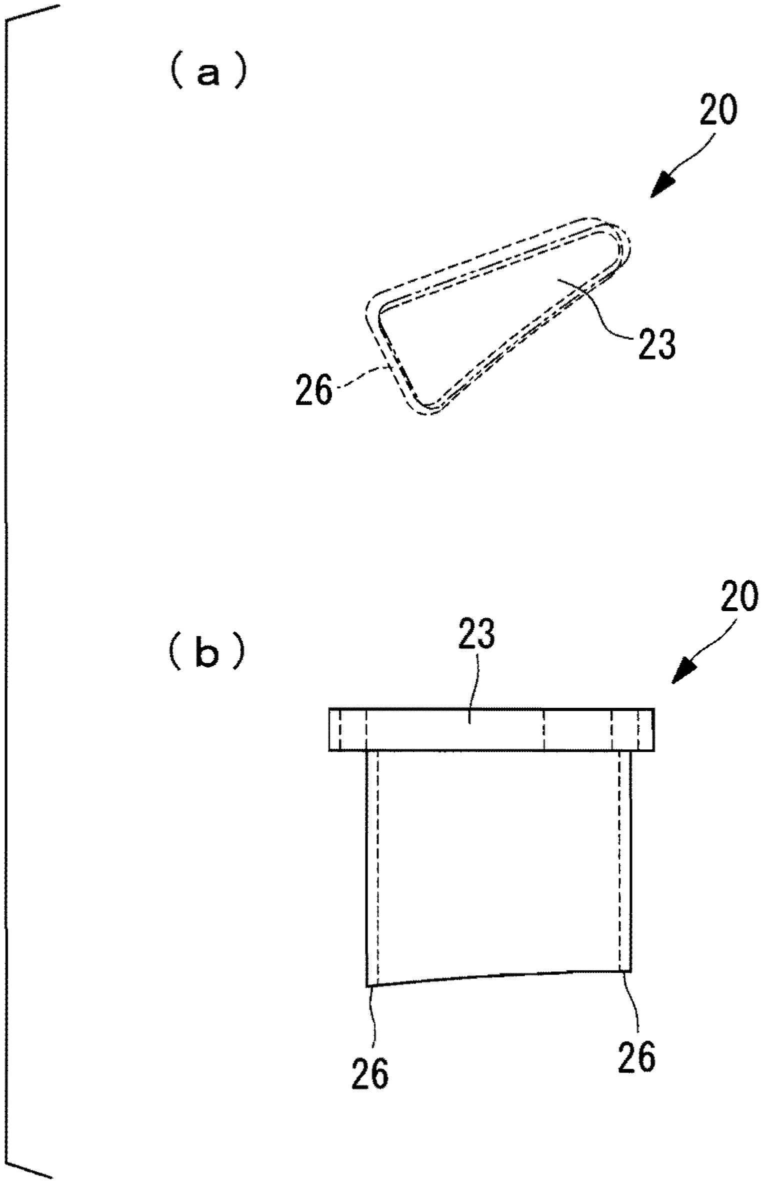
FIG. 5 is a diagram showing a rear-insert electrode that forms the gas-turbine-stator-vane insert removing device according to the embodiment of the present invention, where (a) is a plan view thereof and (b) is a side view thereof.
Figure 6:
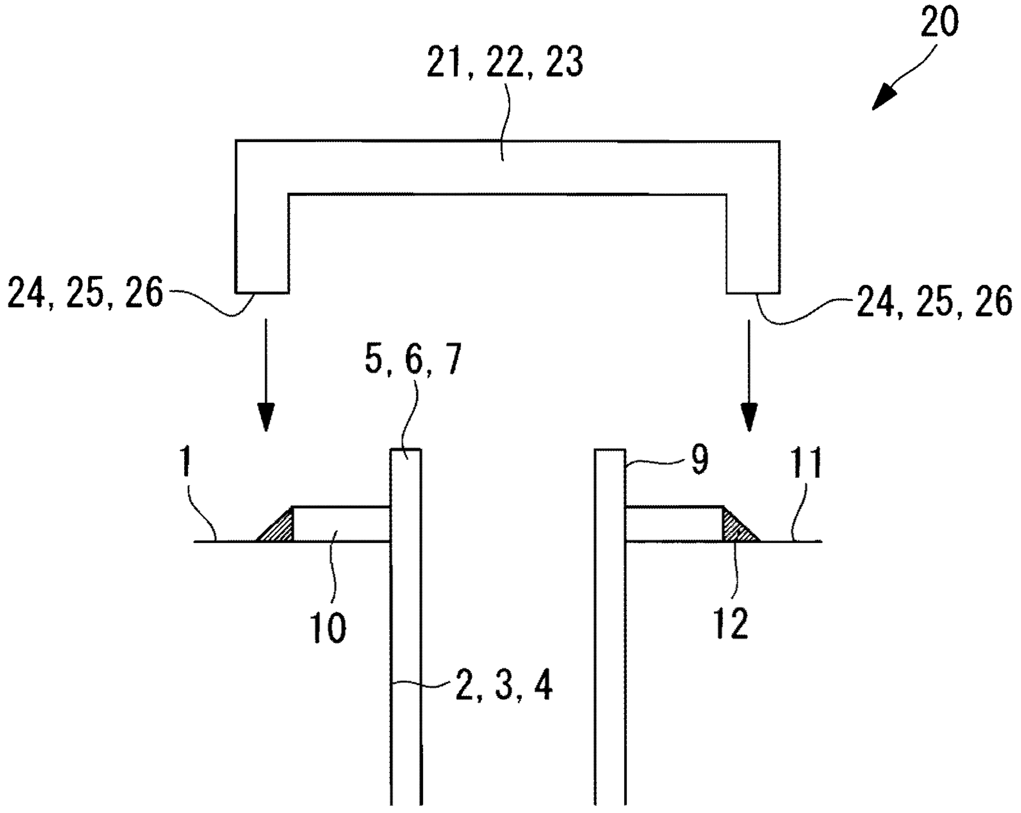
FIG. 6 is a diagram showing relative relationships between welding metal and the front-insert electrode, the middle-insert electrode, and the rear-insert electrode.

FIG. 1 is an external view of a gas-turbine stator vane according to the present invention, where (a) is an overall view and (b) is a perspective view showing a state in which an insert is taken out from a hollow hole; FIG. 2 is a plan view showing relevant portions in FIG. 1; FIG. 3 is a diagram showing a front-insert electrode that forms a gas-turbine-stator-vane insert removing device according to an embodiment of the present invention, where (a) is a plan view thereof and (b) is a side view thereof; FIG. 4 is a diagram showing a middle-insert electrode that forms the gas-turbine-stator-vane insert removing device according to the embodiment of the present invention, where (a) is a plan view thereof and (b) is a side view thereof; FIG. 5 is a diagram showing a rear-insert electrode that forms the gas-turbine-stator-vane insert removing device according to the embodiment of the present invention, where (a) is a plan view thereof and (b) is a side view thereof; and FIG. 6 is a diagram showing relative relationships between welding metal and the front-insert electrode, the middle-insert electrode, and the rear-insert electrode.

As shown in FIGS. 1 and 2, a gas-turbine stator vane 15 according to the present invention, which is a gas-turbine stator vane to be applied to, for example, a 1500° C.-class gas turbine, is equipped with a blade surface (blade main unit) 1 provided with a front hollow hole 2, a middle hollow hole 3, and a rear hollow hole 4, and is configured so that, individually, a hollow front insert 5 is inserted into the front hollow hole 2, a middle insert 6 is inserted into the middle hollow hole 3, and a rear insert 7 is inserted into the rear hollow hole 4. In addition, numerous cooling-air jetting holes 8 having diameters of 0.1 mm to 0.5 mm are provided in each of the front insert 5, the middle insert 6, and the rear insert 7. In addition, as shown in FIG. 6, one end of the front insert 5, the middle insert 6, and the rear insert 7 is provided with insert collars (flange portions) 10 along circumferential directions thereof, which protrude outward from insert outer circumferential surfaces 9, and the insert collars 10 and a stator-vane-outer-shroud non-gas path surface 11 of the blade surface 1 are connected by means of welding. Note that the reference sign 12 in FIG. 6 indicates welding metal.

The gas-turbine-stator-vane insert removing device (hereinafter, referred to as "insert removing device") 20 according to this embodiment is an "electrical discharging machine" provided with a front-insert electrode 21, a middle-insert electrode 22, and a rear-insert electrode 23, wherein the welding metal 12 is removed by generating an arc discharge, which is repeated at a short cycle, between the blade surface 1 and the front-insert electrode 21, the middle-insert electrode 22, and the rear-insert electrode 23.

The front-insert electrode 21 shown in FIG. 3 has the same plan-view shape as the plan-view shape of the welding metal 12 (see FIG. 6) that connects the insert collar 10 of the front insert 5 and the stator-vane-outer-shroud non-gas path surface 11 that surrounds the periphery of the front hollow hole 2, and also has a bottom surface 24 that matches a curved-surface shape of the stator-vane-outer-shroud non-gas path surface 11 which faces it during the electrical discharging (during removal work of the front insert).

The middle-insert electrode 22 shown in FIG. 4 has the same plan-view shape as the plan-view shape of the welding metal 12 (see FIG. 6) that connects the insert collar 10 of the middle insert 6 and the stator-vane-outer-shroud non-gas path surface 11 that surrounds the periphery of the middle hollow hole 3 (has the same inner circumferential edge and outer circumferential edge as an inner circumferential edge and an outer circumferential edge of the welding metal 12), and also has a bottom surface 25 that matches the curved-surface shape of the stator-vane-outer-shroud non-gas path surface 11 which faces it during the electrical discharging (during removal work of the middle insert).

The rear-insert electrode 23 shown in FIG. 5 has the same plan-view shape as the plan-view shape of the welding metal 12 (see FIG. 6) that connects the insert collar 10 of the rear insert 7 and the stator-vane-outer-shroud non-gas path surface 11 that surrounds the periphery of the rear hollow hole 4, and also has a bottom surface 26 that matches the curved-surface shape of the stator-vane-outer-shroud non-gas path surface 11 which faces it during the electrical discharging (during removal work of the rear insert).

Next, the method of removing a gas-turbine-stator-vane insert (hereinafter, referred to as "insert removal method") according to this embodiment will be described.

First of all, the gas-turbine stator vane 15, from which the front insert 5, the middle insert 6, and the rear insert 7 are to be detached, is set at a predetermined position in the insert removing device 20.

Next, the front-insert electrode 21 and the welding metal 12 are aligned so that the bottom surface 24 of the front-insert electrode 21 faces the welding metal 12, which connects the insert collar 10 of the front insert 5 and the stator-vane-outer-shroud non-gas path surface 11 that surrounds the periphery of the front hollow hole 2, and, in addition, so that a predetermined gap (about 3 μm to 200 μm), which is also kept constant, is formed between the bottom surface 24 and the welding metal 12.

Subsequently, the insert removing device 20 is activated to generate an arc discharge between the bottom surface 24 of the front-insert electrode 21 and the stator-vane-outer-shroud non-gas path surface 11 of the blade surface 1, thus removing the welding metal 12 by means of electrical discharge.

Next, the middle-insert electrode 22 and the welding metal 12 are aligned so that the bottom surface 25 of the middle-insert electrode 22 faces the welding metal 12, which connects the insert collar 10 of the middle insert 6 and the stator-vane-outer-shroud non-gas path surface 11 that surrounds the periphery of the middle hollow hole 3, and, in addition, so that the predetermined gap (about 3 μm to 200 μm), which is also kept constant, is formed between the bottom surface 25 and the welding metal 12.

Subsequently, the insert removing device 20 is activated to generate the arc discharge between the bottom surface 25 of the middle-insert electrode 22 and the stator-vane-outer-shroud non-gas path surface 11 of the blade surface 1, thus removing the welding metal 12 by means of electrical discharge.

Next, the rear-insert electrode 23 and the welding metal 12 are aligned so that the bottom surface 26 of the rear-insert electrode 23 faces the welding metal 12, which connects the insert collar 10 of the rear insert 7 and the stator-vane-outer-shroud non-gas path surface 11 that surrounds the periphery of the rear hollow hole 4, and, in addition, so that the predetermined gap (about 3 μm to 200 μm), which is also kept constant, is formed between the bottom surface 26 and the welding metal 12.

Subsequently, the insert removing device 20 is activated to generate the arc discharge between the bottom surface 26 of the rear-insert electrode 23 and the stator-vane-outer-shroud non-gas path surface 11 of the blade surface 1, thus removing the welding metal 12 by means of electrical discharge.

Then, the gas-turbine stator vane 15, in which the welding metal 12 that connects the insert collar 10 of the front insert 5 and the stator-vane-outer-shroud non-gas path surface 11, which surrounds the periphery of the front hollow hole 2, the welding metal 12 that connects the insert collar 10 of the middle insert 6 and the stator-vane-outer-shroud non-gas path surface 11, which surrounds the periphery of the middle hollow hole 3, and the welding metal 12 that connects the insert collar 10 of the rear insert 7 and the stator-vane-outer-shroud non-gas path surface 11, which surrounds the periphery of the rear hollow hole 4, have been removed, is taken out from the insert removing device 20, and the front insert 5 is taken out from the front hollow hole 2, the middle insert 6 is taken out from the middle hollow hole 3, and the rear insert 7 is taken out from the rear hollow hole 4, thus separating the front insert 5, the middle insert 6, and the rear insert 7 from the blade surface 1.

Note that, in the case in where it is difficult to take out the front insert 5 from the front hollow hole 2, to take out the middle insert from the middle hollow hole 3, and to take out the rear insert 7 from the rear hollow hole 4 due to the welding metal 12 remaining after the electrical discharge, the welding metal 12 is eliminated by using a grinding machine, such as a grinder, etc., such that the front insert 5 is taken out from the front hollow hole 2, the middle insert 6 is taken out from the middle hollow hole 3, and the rear insert 7 is taken out from the rear hollow hole 4.

In the insert removing device and the insert removing method according to this embodiment, the gas-turbine stator vane 15, from which the front insert 5, the middle insert 6, and the rear insert 7 are to be detached, is set at the predetermined position in the insert removing device 20; the front-insert electrode 21, the middle-insert electrode 22, and the rear-insert electrode 23 are aligned with the welding metal 12 so that the bottom surface 24 of the front-insert electrode 21, the bottom surface 25 of the middle-insert electrode 22, and the bottom surface 26 of the rear-insert electrode 23 face the welding metal 12, and, in addition, so that the predetermined gaps (about 3 μm to 200 μm) are formed between the welding metal 12 and the bottom surface 24 of the front-insert electrode 21, the bottom surface 25 of the middle-insert electrode 22, and the bottom surface 26 of the rear-insert electrode 23; the insert removing device 20 is activated to generate the arc discharges between the stator-vane-outer-shroud non-gas path surface 11 and the bottom surface 24 of the front-insert electrode 21, the bottom surface 25 of the middle-insert electrode 22, and the bottom surface 26 of the rear-insert electrode 23; and thereby, the welding metal 12 is removed by means of electrical discharge.

Accordingly, it is possible even for a person without well-developed skill to easily and quickly detach the front insert 5, the middle insert 6, and the rear insert 7 from the blade surface 1 of the gas-turbine stator vane 15.

In addition, with the gas-turbine-stator-vane insert removing device according to this embodiment, the bottom surface 24 of the front-insert electrode 21, the bottom surface 25 of the middle-insert electrode 22, and the bottom surface 26 of the rear-insert electrode 23 have the shapes that match the curved-surface shape of the stator-vane-outer-shroud non-gas path surface 11, which faces them during the electrical discharging, and thus, the gaps between the welding metal 12 and the bottom surface 24 of the front-insert electrode 21, the bottom surface 25 of the middle-insert electrode 22, and the bottom surface 26 of the rear-insert electrode 23 are kept (substantially) constant in the circumferential direction; therefore, the intensity of the arc discharges generated between the stator-vane-outer-shroud non-gas path surface 11 and the bottom surface 24 of the front-insert electrode 21, the bottom surface 25 of the middle-insert electrode 22, and the bottom surface 26 of the rear-insert electrode 23 can be kept (substantially) constant in the circumferential direction, and the welding metal 12 can be (substantially) evenly removed in the circumferential direction.

Note that the present invention is not limited to the above-described embodiment, and appropriate alterations and modifications are also possible as needed.

For example, although the detachment in the above-described embodiment is performed in the order from the front insert 5, the middle insert 6, and the rear insert 7, the detachment may be performed in order starting from the rear insert 7, the middle insert 6, and the front insert 5, and the detachment order can be appropriately changed in consideration of work efficiency, etc.

In addition, in the above-described embodiment, the inner circumferential edges of the bottom surface 24 of the front-insert electrode 21, the bottom surface 25 of the middle-insert electrode 22, and the bottom surface 26 of the rear-insert electrode 23 are set to be the same as (to match) the inner circumferential edge of the welding metal 12; however, it is more preferable if the inner circumferential edges of the bottom surface 24 of the front-insert electrode 21, the bottom surface 25 of the middle-insert electrode 22, and the bottom surface 26 of the rear-insert electrode 23 are set so as to be positioned 1 mm to 2 mm inside the inner circumferential edge of the welding metal 12.

Accordingly, because the circumferential edges of the insert collars 10 melted into the welding metal 12 are exposed, thus disengaging the connections between the insert collars 10 and the stator-vane-outer-shroud non-gas path surface 11, it is possible to eliminate work such as eliminating (removing) the connecting portions between the insert collars 10 and the stator-vane-outer-shroud non-gas path surface 11 by using a grinding machine, such as a grinder, etc.; work time can be shortened; and the work efficiency can be further improved.

Furthermore, when applying, as needed, appropriate refurbishing, etc., to the blade surface 1, from which the front insert 5, the middle insert 6, and the rear insert 7 have been detached, and to the front insert 5, the middle insert 6, and the rear insert 7, which have been detached from the blade surface 1, and when reassembling them to be reused as a gas-turbine stator vane, it is desirable that the front insert 5, the middle insert 6, and the rear insert 7 be attached to the original blade surface 1 (into which they had been inserted).

By doing so, even in the case in which deformation has occurred in the front insert 5, the middle insert 6, and the rear insert 7 themselves, reuse is made possible by attaching them to the original blade surface 1, thus making it possible to prevent the front insert 5, the middle insert 6, the rear insert 7, and the gas-turbine stator vane 15 from being discarded, and the running cost can be reduced.

REFERENCE SIGNS LIST

1 blade surface
2 front hollow hole
3 middle hollow hole
4 rear hollow hole
5 front insert
6 middle insert
7 rear insert
8 cooling-air jetting hole
9 insert outer circumferential surface
10 insert collar
11 stator-vane-outer-shroud non-gas path surface
12 welding metal
15 gas-turbine stator vane
20 insert removing device (gas-turbine-stator-vane insert removing device)
21 front-insert electrode
22 middle-insert electrode
23 rear-insert electrode
24 front-insert-electrode bottom surface
25 middle-insert-electrode bottom surface
26 rear-insert-electrode bottom surface

The invention claimed is:

1. A gas-turbine-stator-vane insert removing device with which welding metal that connects an insert collar, which protrudes outward from an outer circumferential surface of an insert, and a stator-vane-outer-shroud non-gas path surface, which surrounds the periphery of the insert collar, is removed by means of an arc discharge repeated at a short cycle between an electrode and a blade surface of a gas-turbine stator vane, wherein a bottom surface of the electrode has the same plan-view shape as a plan-view shape of the welding metal.

2. A gas-turbine-stator-vane insert removing device according to claim 1, wherein the bottom surface has a shape that matches a curved-shape surface of the stator-vane-outer-shroud non-gas path surface of the blade surface which faces the bottom surface during electrical discharging.

3. A gas-turbine-stator-vane insert removing device according to claim 1, wherein an inner circumferential edge of the bottom surface is formed so as to be positioned 1 mm to 2 mm inside an inner circumferential edge of the welding metal.

4. A method of removing a gas-turbine-stator-vane insert performed by employing the gas-turbine-stator-vane insert removing device according to claim 1, comprising:

a step of setting a gas-turbine stator vane, from which an insert is to be detached, at a predetermined position in the gas-turbine-stator-vane insert removing device;

a step of aligning the electrode and the welding metal so that the bottom surface of the electrode faces the welding metal, and, in addition, so that a predetermined gap is formed between the bottom surface of the electrode and the welding metal;

a step of removing the welding metal by means of electrical discharge by activating the gas-turbine-stator-vane insert removing device and by generating an arc discharge between the bottom surface of the electrode and the stator-vane-outer-shroud non-gas path surface; and a step of separating the insert from the blade surface.

* * * * *